May 7, 1935.  H. WILLSHAW ET AL  2,000,430
APPARATUS FOR MOLDING AND VULCANIZING PNEUMATIC TIRE COVERS AND THE LIKE
Filed Oct. 11, 1934   3 Sheets-Sheet 3
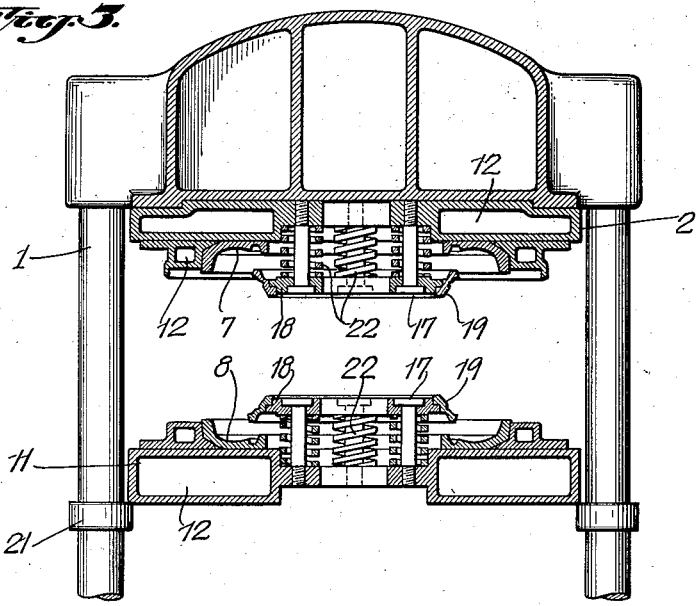
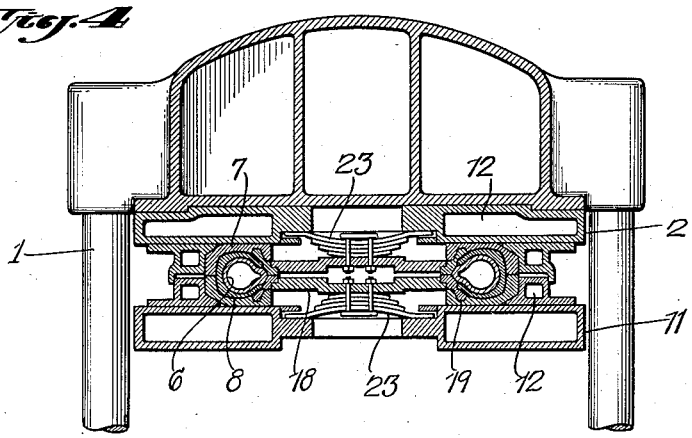
Inventors:
Harry Willshaw,
Thomas Norcross and
Frederick George Broadbent
BY
ATTORNEYS Patented May 7, 1935

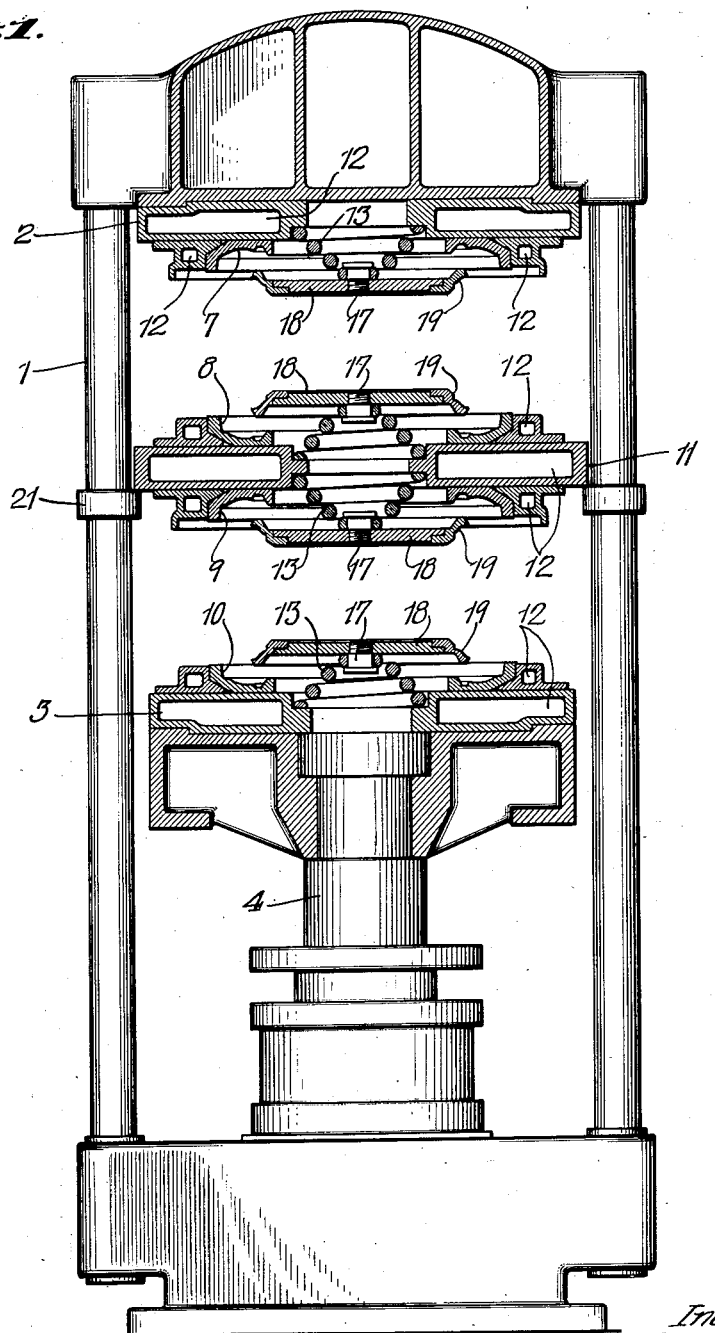

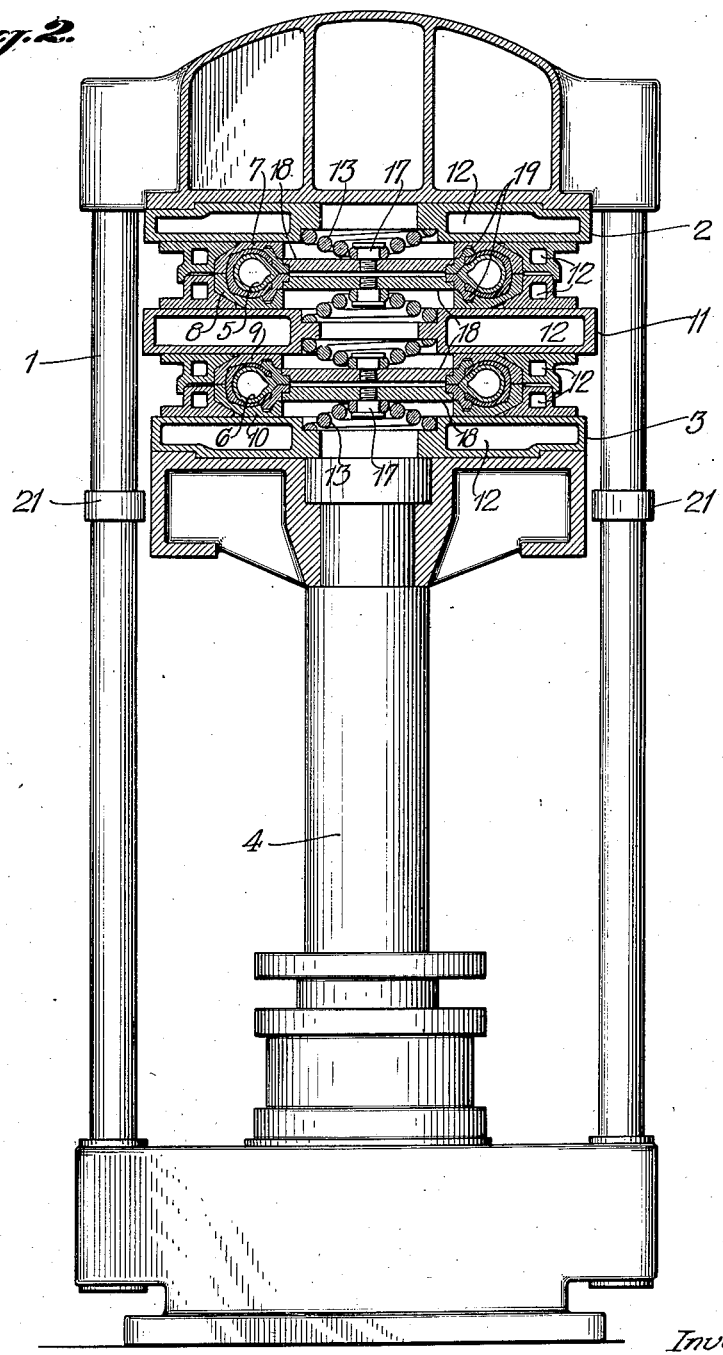

2,000,430

UNITED STATES PATENT OFFICE 2,000,430

APPARATUS FOR MOLDING AND VULCANIZING PNEUMATIC TIRE COVERS AND THE LIKE

Harry Willshaw, Sutton Coldfield, and Thomas Norcross and Frederick George Broadbent, Erdington, Birmingham, England, assignors to Dunlop Tire and Rubber Corporation, Buffalo, N. Y., a corporation of New York Application October 11, 1934, Serial No. 747,834
In Great Britain September 12, 1933

5 Claims. (Cl. 18—17)

This invention relates to apparatus for molding and vulcanizing pneumatic tires and the like, and specifically to such apparatus utilizing the means known in the tire trade as a "clip-ring", by which term is meant the parts which shape the bead and adjacent surfaces of the tire, said parts being separate from the rest of the mold, e. g. separate from the parts which shape the side walls and tread of the tire.

The said invention is particularly applicable to apparatus of the "press" type wherein opening and closing is effected by longitudinal movement of the mold parts but it may also be applied to apparatus of the "pot" type wherein opening and closing involves a pivotal movement of the mold parts.

According to this invention the clip-ring is spring loaded specifically for the purposes of stripping the tire from the mold, said spring loading providing the necessary stripping pressure.

Preferably the clip-ring is in two main parts, e. g. a pair of mating rings, and we use the term clip-ring to cover such a unit as a whole or in part; in the preferred scheme both said parts are spring loaded so as to strip both halves of the tire from the mold.

Various other features and provisions of our invention will become apparent as the description proceeds.

In order that our invention may be more easily understood and readily carried into effect the same will now be described with reference to the accompanying drawings, in which:—

Figs. 1 and 2 are cross-sectional elevations of the preferred form of our invention showing the apparatus open and closed respectively.

Figs. 3 and 4 are cross-sectional part elevations showing two alternative springing means.

As shown in these drawings the apparatus is of the press type and comprises four vertical pillars 1, a fixed top platen 2 and a bottom platen 3 movable hydraulically by the ram 4.

In the preferred arrangement two tires 5 and 6 are molded at once, four half-molds 7, 8, 9 and 10 being used, one half 7 being fixed to the top platen, one half 10 to the bottom platen and one each, 8 and 9, to opposite faces of an intermediate or center platen 11 disposed between the top and bottom platens 2 and 3.

These mold halves and platens are associated with heating units, e. g. steam chests 12, and the arrangement in this respect may be according to our British Patent No. 404,110.

In the preferred embodiment of the present invention, associated with each platen there is one volute spring 13 disposed centrally of the molds.

The large diameter end 14 of this spring is fixed to the platen face as by screws indicated at 15 while the small diameter end 16 of said spring is fixed by means of a screwed member 17 to a member 18.

To this member 18 the clip-ring 19 is fixed said clip-ring comprising in this the preferred arrangement two main parts, i. e. a pair of mating rings as shown in the drawings.

Thus it will be seen that the springs 13 provide the main support between the clip-ring and the platens, the member 18 is in effect an extension of the clip-ring and may indeed be an integral part thereof.

Operation is as follows, assuming that "cure" i. e. molding and vulcanizing of the tires is complete. The hydraulic means is operated to open the press: the lower platen falls away: this initiates opening movement of all four springs until now held compressed: as the springs open out they push the clip-rings out of the mold halves— and so automatically strip both tire covers with the one opening movement of the apparatus.

The springs carried by the top and bottom platens push the clip-rings out of the extreme top and bottom half-molds, and the springs carried by the center platen exert their pressure in opposite directions outwardly therefrom so as to push the clip-ring out of the two half molds associated therewith.

Thus we provide a simple but highly ingenious and efficient arrangement whereby the tires are stripped from the molds automatically.

In the larger sizes of tire usually molded in an autoclave—to which sizes the present invention is particularly applicable—stripping has hitherto involved much arduous labor and the use of various mechanical contrivances for the purpose of "plucking" the tire out of its mold. Very considerable force is required to do this and unless the operation is carried out with great skill and care it may tend to damage the tire: by the present invention that possibility is obviated entirely and thus it will be seen that the present invention has a direct bearing upon the quality of the tire cover itself.

An important distinction between the invention according to our prior British Patent No. 291,905 and the present invention is that, whereas according to our earlier invention the clip-ring was spring loaded to allow it to remain within the apparatus or to ensure that one part of the tire left one mold part before the other, the clip-ring according to the present invention is spring loaded specifically for the purpose of stripping the tire from the mold, said spring loading providing the necessary stripping pressure.

Nevertheless, the present invention also provides a novel and highly efficient alternative arrangement to that according to our prior patent, the preferred embodiment of the present invention for example associating with a given clip-ring a single spring of the volute type instead of a plurality of parallel helical springs, said single spring conveniently providing the main support between the clip-ring and the rest of the apparatus.

When tires of a comparatively small rim diameter are being dealt with there arises a difficulty in disposing the springing medium in the very confined space available and this problem is solved by the provisions of the present invention in the embodiment utilizing volute springs as exemplified in Figs. 1 and 2 of the drawings.

If desired the springs may be so arranged as to strength or size that certain faces of the tire are stripped first e. g. the top spring of each pair may be stronger or have a longer stroke than the respective lower springs so as to ensure that the top face of the tire is stripped first, this leaving the tire readily accessible on the lower half of the clip-ring.

The center or intermediate platen 11 in the open position is supported on collars 21 on the pillars 1 of the press. This provision is made specifically for the purpose of supporting the center platen while the press is open: it may also assist in stripping the lower tire but usually both tires have been stripped by the action of the springs before the middle platen comes to rest.

It is not to be construed that we are limited to the precise details set out above.

For example instead of using the volute type of springs we may use other types such as the parallel helical or the laminated blade type, and instead of using a single spring acting on each clip-ring half we may use a plurality of springs.

For example Fig. 3 illustrates an instance in which we use four helical springs 22, while Fig. 4 illustrates an instance in which we utilize one laminated blade type of spring 23, acting on each clip-ring half.

Again we do not confine ourselves to the molding of two tires at once as we may adapt the apparatus for molding one tire or more than two; and we do not confine ourselves to any particular disposition of the apparatus in relation to the floor—for example the press type of apparatus may be disposed not vertically, but at a suitable oblique angle to the floor; and we do not desire any restriction to be read into the terms "pot" or "press" as our invention may also be applied to apparatus which it may be difficult definitely to assign to either type group.

Having now particularly described our said invention, we claim:—

1. Molding and vulcanizing apparatus comprising a pair of steam chests, a pair of mold halves, one for each steam chest, and arranged in complementary positions, clip rings, one for each mold half, and resilient means for mounting said clip rings on said steam chests to separate said clip rings from their respective mold halves when said mold halves and steam chests are in separated positions.

2. The apparatus of claim 1 in which said resilient mounting means is a spring.

3. Apparatus comprising a pair of steam chests, a pair of mold halves, one for each steam chest, in complementary positions, clip rings, one for each mold half, and volute springs, one between each of said steam chests and clip rings to resiliently support said clip rings spaced from their respective mold half.

4. Molding and vulcanizing apparatus comprising a series of steam chests, pairs of mold halves, one pair between successive steam chests, the mold halves of said pairs being mounted one on each of the opposite faces of said steam chests, clip rings, one for each mold half, and resilient mounting means for mounting said clip rings on the respective steam chests to space said clip rings resiliently from their respective mold halves.

5. The apparatus of claim 4 in which said resilient means comprise volute springs.

HARRY WILLSHAW.
THOMAS NORCROSS.
FREDERICK GEORGE BROADBENT.